United States Patent [19]

Tanaka et al.

[11] Patent Number: 4,837,689
[45] Date of Patent: Jun. 6, 1989

[54] INPUTTING AND EDITING SYSTEM IN A KNOWLEDGE BASED INQUIRY AND ANSWER SYSTEM

[75] Inventors: Toshiyuki Tanaka, Yamatokoriyama; Shigeki Kuga, Nara; Taro Morishita; Nobuo Nakamura, both of Yamatokoriyama; Mikio Ohsaki, Kashihara, all of Japan

[73] Assignee: Sharp Kabushiki Kaisha, Osaka, Japan

[21] Appl. No.: 915,021

[22] Filed: Oct. 3, 1986

[30] Foreign Application Priority Data

Oct. 7, 1985 [JP] Japan .............................. 60-225188
Oct. 7, 1985 [JP] Japan .............................. 60-225189

[51] Int. Cl.$^4$ ........................................... G06F 15/38
[52] U.S. Cl. .................................... 364/419; 364/900
[58] Field of Search ........ 364/513, 419, 200 MS File, 364/900 MS File

[56] References Cited

U.S. PATENT DOCUMENTS

| 4,658,370 | 4/1987 | Erman et al. | 364/513 |
| 4,670,848 | 6/1987 | Schramm | 364/513 |
| 4,688,195 | 8/1987 | Thompson et al. | 364/300 |
| 4,736,296 | 4/1988 | Katayama et al. | 364/419 |

FOREIGN PATENT DOCUMENTS 0216229 12/1984 Japan .
0144868 7/1985 Japan .
0157659 8/1985 Japan .

Primary Examiner—Clark A. Jablon
Attorney, Agent, or Firm—Birch, Stewart, Kolasch & Birch

[57] ABSTRACT

The present invention discloses an inputting system for an inquiry-and-answer which removes the necessiates for strict analysis of the meaning of a response to an inquiry in order to extract necessary facts for inferences. By considering the response by an operator along with its corresponding inquiry from the system, the inputting system is enabled to editing the knowledge data base in a much easier fashion than the prior art. The inputting and editing system analyzes the answer to an interrogative and matches the pronouns and other elements of the answer with their corresponding elements from the interrogative so that the operator does not have to answer the interrogative with the exact language of the interrogative for the system to understand and utilize the answer properly.

2 Claims, 7 Drawing Sheets

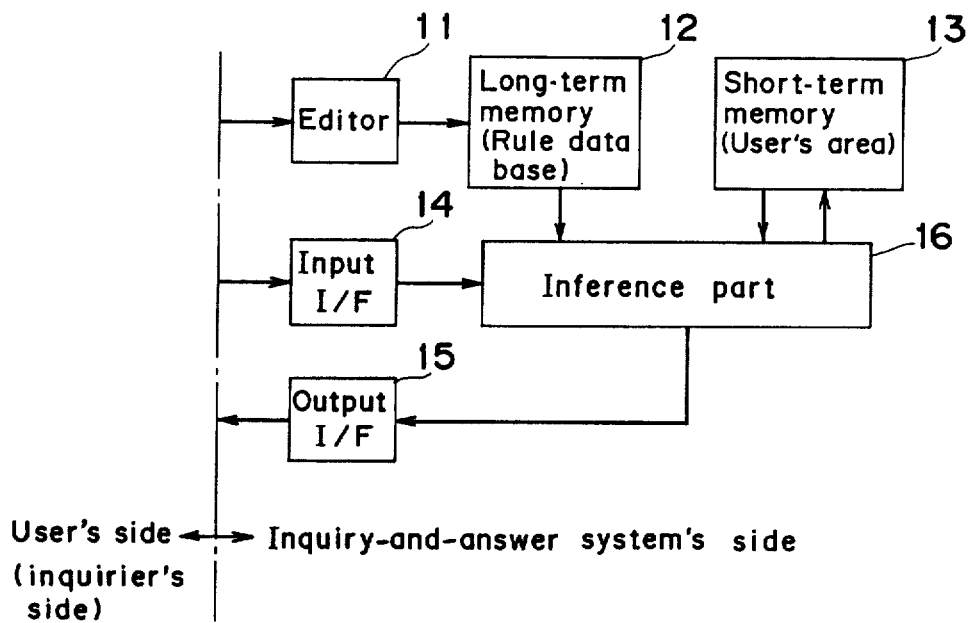

Fig. 8

S31 Inputted sentence ---→ Mori ga 9ji ni shutcho suru.
(= Mori is go out on his business trip at 9 o'clock.)

S32 Analysis of elements ---→ Mori/ga/9/ji/ni/shutcho/suru/
(= Mori/is/go/out/on/his/business trip/at/9/o'clock.)

S33 Analysis of the syntax ---→ Mori ga/9ji ni/shutcho suru /
(= Mori is/go out/on his business trip /at 9 o'clock.)

S34 Analysis of the meating ---→ Mori ga/9ji ni/shutcho suru /
‖      ‖      ‖
ag     time (move, predicate)

S35 Determination of the internal structure ---→
⎡ shutcho suru (ag, Mori, nashi, ze, 1)
⎢ (= to go out on his business trip)
⎢ (ag, Mori, none, affirmative, ze, 1)
⎢
⎢ shutcho suru (time, 9, o'clock,
⎢                  affirmative, 1)
⎢ (= to go out on his busines trip)
⎣ (time, 9, o'clock, affirmative, ze, 1)

INPUTTING AND EDITING SYSTEM IN A KNOWLEDGE BASED INQUIRY AND ANSWER SYSTEM

BACKGROUND OF THE INVENTION

1. Field of the Invention

The present invention generally relates to a conversation type inquiry-and-answer system employed in a diagnosing apparatus or the like, and more particularly, to the improvement of the inputting system of the inquiry-and-answer system.

The inquiry-and-answer system is designed to process data in a conversation manner between an operator and the system on the basis of a knowledge data base which is comprised of a first memory for storing information such as facts and rules and a second memory for storing the contents of inquiries and their responses. The present invention further relates to the editing system of the above-mentioned knowledge data base (adding and erasing system of the facts and rules).

2. Description of the Prior Art

In recent years, various kinds of expert systems have been developed which, based on computer systems, are able to make inferences by the utilization of professional knowledge as data base.

Along with the expert systems referred to above, the present invention has been designed, and shown in FIG. 5, with a long-term storage area 12 having the rules and facts already stored in it, and a short-term storage area 13 that stores facts during the inference by the system while the operator makes responses to inquiries. The internal structure of the inquiry is determined on the basis of the rules and facts stored in the aforementioned two storage areas. It is to be noted here that the internal structure mentioned above represents a form of descriptive facts in the interior of the present invention as exemplified in FIG. 2. The flow-chart of FIG. 8 indicates the processing procedure of an inputted sentence in a prior art expert system. In step S32, a sentence is inputted by the operator. For example, the sentence is "Mori is to go out of his business trip at 9 o'clock". (an English version for a Japanese sentence of "Mori ga 9 ji ni shuccho suru") is disassembled into elements to read "Mori/ is/ to/ go/ out/ on/ his/ business/ trip/ at/ 9/ o'clock". (an English version for a Japanese sentence of "Mori/ ga/ 9/ ji/ ni/ shuccho/ suru"). Then, in step S33, the inputted sentence is analyzed from the view-point of syntax and the relative connection between the elements to read "Mori is/ to go out/ on his business trip/ at 9 o'clock". (an English version for a Japanese sentence of "Mori ga/ 9 ji ni/ shuccho suru"). Thereafter, each elements is interpreted in step S34 in the manner as follows;

Mori→ag., 9→time, at→conjunction, etc. so that the internal structure with respect to the inputted sentence is determined in step S35.

In the prior art expert system, however, if the response from the operator does not satisfy even one of the various conditions to be met in order to analyze the meaning of the outputted sentence, the same inquiry is repeatedly given to the operator until a correct an accurate answer to the inquiry is obtained.

For example, in an expert system for use in a business trip application, if the operator makes an abbreviated response such as "Mori does." (an English version for a Japanese sentence of "Mori desu") or "Mori." (an English version for a Japanese sentence of "Mori") to an inquiry from the system for example, "Who goes out on a business trip?" (an English version for a Japanese sentence of "Darega shuccho shimasuka"), the analysis of the meaning of the response cannot be made, and subsequently the system cannot extract the necessary facts from the response. Therefore, in the prior art system, if the case as described above occurs, the same inquiry is repeated again and again to obtain the correct answer, the correct answer being "Mori goes out on a business trip." (an English version for a Japanese sentence of "Mori ga shuccho shimasu"), or comments for more correct answer are generated.

As is described above, the prior art expert system requires an accurate and correct answer to be given by the operator to an inquiry from the system. A correct and accurate answer to the inquiry, namely, a correct answer without using an abbreviation is a must for the prior art expert system even in the case where the answer is not directly related to the fact the system desires to know. Therefore, it has been an overburden to answer the inquiries in the prior art expert system.

In addition to the above-described expert system to be used in an application for a business trip, other kinds of expert systems such as a reservation system or a diagnosing device have been proposed. The expert system of this kind has two storage areas, i.e., the short-term storage the area for temporarily storing contents of inquiries from the system and the responses by the operator the the inquiries and the long term storage area for storing rules and facts to be employed during the inferences. The method for storing in and referring to these two storage areas are precisely distinguished from each other.

More specifically, data are stored in the short-term storage area, but not directly by the operator, as the operator makes a response to an inquiry during the inference.

Moreover, only the facts belonging to the area where the inference is directed to are referred to. On the other hand, in the long-term storage area of the expert system, rules and facts which are referred to during the reference can be written into directly by the operator by using a knowledge editor (editing program).

The editing or the knowledge data base being conducted in the conventional manner is shown in the flow-chart of FIG. 4, where fresh facts and rules are added to the data base or some of the facts or rules already stored in the data base are erased from the data base.

Specifically, the knowledge editor (editing program) is started-up at step n1. In step n2, rules and facts are added or erased directly to or from the long-term storage area. After completing the addition or the erasure of the rules and the facts, the inference part, namely, the inference program is started at step n4, so that the added or the erased rules and facts are verified. In other words, the system detects whether or not the added or erased rules and facts match the already-stored rules and facts, in steps n5 and n6. If the added or erased rules and facts match the already-stored rules and facts, the inference part is finished in step n8. On the contrary, if the added or erased rules and facts do not match the already-stored rules and facts, the inference part is finished in step n7, and the flow is returned to step n1.

As is clear from the foregoing description, upon editing the knowledge data base in the prior art expert system, if the verification of the added or erased rules and facts results in a negative, the knowledge editor should be operated and completed again along with the inference part. Therefore, it has been considerably difficult in the prior art expert system to edit the knowledge data base easily.

SUMMARY OF THE INVENTION

Accordingly, the present invention has been developed to substantially eliminate the above-described disadvantages or inconveniences inherent in the prior art inquiry-and-answer system and has as its essential objective to provide an improved inputting system for an inquiry-and-answer system whereby even an abbreviated response made by the operator to an inquiry from the system can be inputted.

A further objective of the present invention is to provide an improved editing system for the knowledge data base in an inquiry-and-answer system.

In accomplishing the above-described objectives, the inputting system of the present invention utilizes the following method: an interrogative pronoun in the inquiry by the system is brought into correspondence with a case nominal obtained through analysis of the meaning of a response to the inquiry, so that the necessary facts for the inference are extracted from the response. The analysis of the meaning is carried out by either a "case" particle, a suffix or a semantic maker, or at least one combination therebetween.

According to the editing system of the present invention, the rules and the facts are not added or erased directly, to or from the long-term storage area by a knowledge editor, but the data to be added or erased is first stored to be verified in a memory to which the operator has a free access. If the verification results in the affirmative, the data are stored in the long-term storage area. As a result, according to the present invention, the knowledge data base can be edited easily.

BRIEF DESCRIPTION OF THE DRAWINGS

These and other objectives and features of the present invention will become apparent from the following description taken in conjunction with preferred embodiments thereof with reference to the accompanying drawings, in which:

FIG. 5 is a functional block diagram of an inquiry-and-answer system equipped with an inputting system according to a second embodiment of the present invention;

FIG. 6 is a view showing one example of the internal structure of the present invention when a sentence is inputted in the inquiry-and-answer system of FIG. 5;

FIG. 8 is a flow-chart showing the procedure of inputting to a prior art inquiry-and-answer system of this kind.

DETAILED DESCRIPTION OF THE EMBODIMENTS

In the description of the present invention, it is to be noted that like parts are designated by like references numerals throughout the accompanying drawings.

According to a first embodiment of the present invention, rules and facts are not added to or erased from the long-term storage area directly by the use of the knowledge editor. Instead, the data are first stored in a memory to which the operator has a free access, thereby enabling verification. If the data are found to be correct through the verification process, the data are finally stored in the long-term storage area or like area. Accordingly, the knowledge data base is easily edited.

Figure 1:
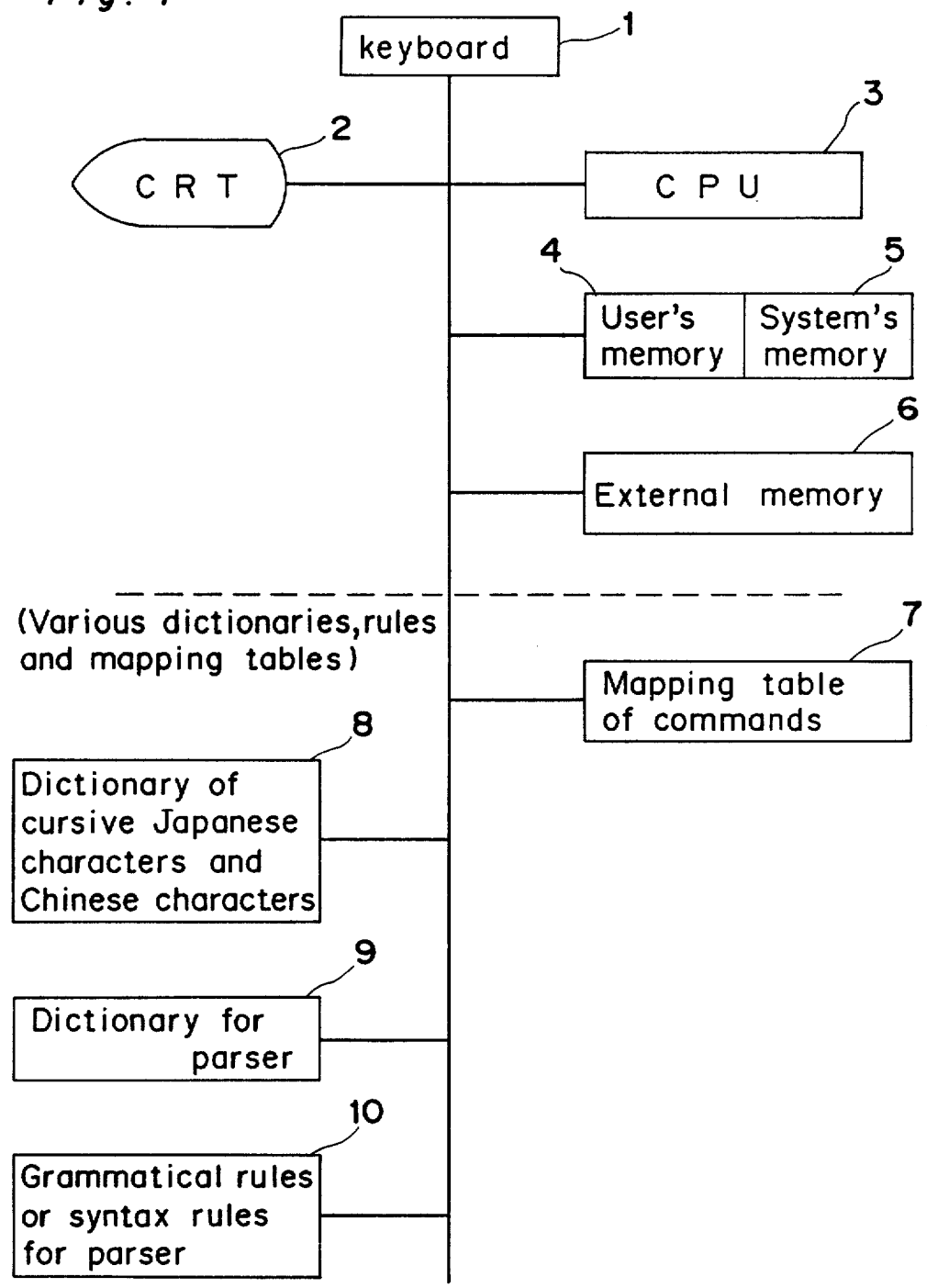
FIG. 1 is a block diagram schematically showing the structure of an inquiry-and-answer system equipped with an editing system according to a first embodiment of the present invention.

Referring to FIG. 1, a block diagram schematically shown illustrating the structure of an inquiry-and-answer system equipped with a editing system according to the first embodiment of the present invention.

In FIG. 1, the inquiry-and-answer system generally consists of a keyboard 1 for inputting rows of Kana characters, namely, cursive Japanese characters, a CRT display 2, a CPU 3 and a user's memory 4 for temporarily storing the contents of inquiries from the system and the corresponding responses by an operator of the system, as well as facts and rules relating to the adding and/or erasing to be executed during the editing process. Thus, the operator is able to write into this memory 4 freely. Moreover, the inquiry-and-answer system includes a system's memory 5 which corresponds to a long-term storage area in a conventional expert system. The contents of the data stored in the system's memory 5 can be changed by a knowledge editor (editing program). The user's memory 4 and system's memory 5 form a so-called knowledge data base.

An external memory 6, such as a floppy disk, is used mainly for extending the system's memory 5. The inquiry-and-answer system further includes a memory 7 for mapping the table of commands, a memory 8 of Kana-Kanji system dictionary, a memory 9 of dictionaries for parsing, and a memory 10 of parsing syntax rules.

The inquiry-and-answer system embodying the present invention is of a type, for example, that is able to process data in the Japanese language in a conversation manner, which consists of: a Kana-Kanji conversion part where a solid-inputted sentence is arranged into an orderly sentence; a parsing part (an analyzing part); and an inquiry-and-answer part. A row of Kana characters are solidly inputted through the keyboard 1 and changed by the conversion part into a sentence of Kana characters mixed with Kanji characters with the help of the memory 8. During the Kana-Kanji conversion, information as to where the sentence is divided into each word ("word" here means an element such as a noun, a particle, or a conjugated ending of a word) and information about the elemental parts of speech are concurrently obtained. In the parsing part, by utilizing the above information on the elements, the memory 10 containing parsing syntax rules and the memory 9 containing the dictionaries for parsing, each word is analyzed from the viewpoint of the syntax to form a tree showing the analyzed structure of the sentence. The parsing part is designed to change the tree showing the analyzed structure of the inputted sentence into a form utilizable by the inquiry-and-answer part, that is, in the form of a simple sentence and also to obtain the relationship between simple sentences.

Figure 2:
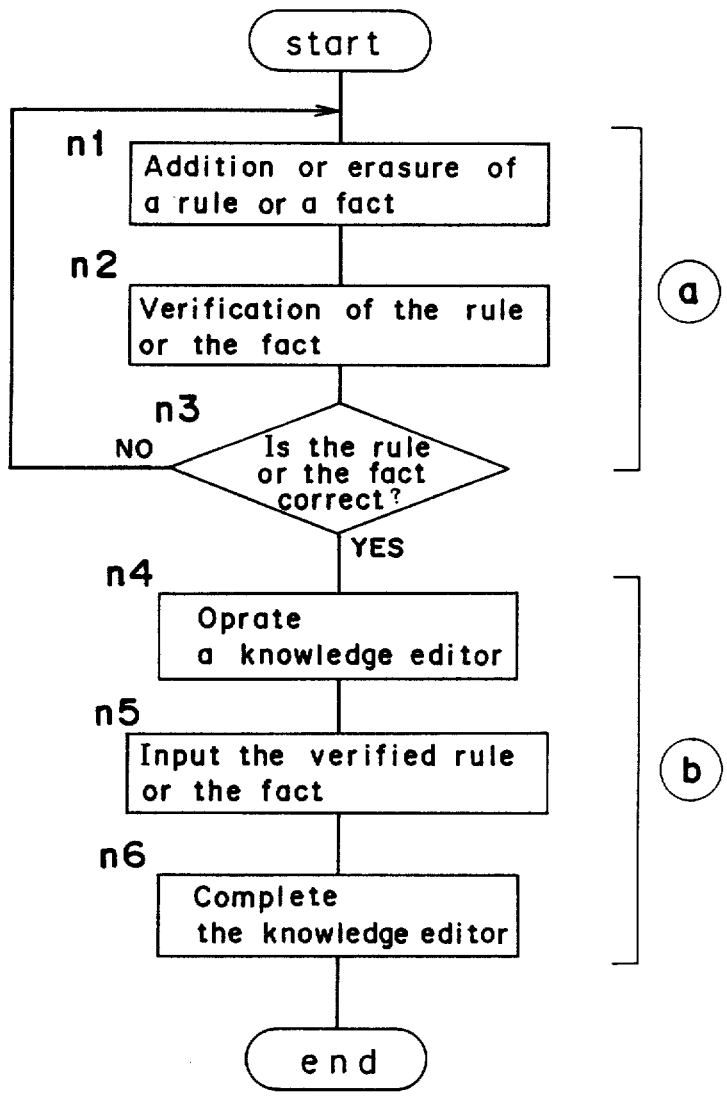
FIG. 2 is a flow-chart showing the procedure of editing of the knowledge data base in the inquiry-and-answer system of FIG. 1.

FIG. 2 is a flow-chart showing the editing procedure of the knowledge data base in the inquiry-and-answer system.

Referring to FIG. 2, ⓐ represents the flow in which rules and facts stored in the user's memory 4 are verified, and ⓑ represents the flow the process where rules and facts, found to be correct after verification, are written into the system's memory 5.

One of the feature characteristics of this inquiry-and-answer system is that the inference part in the system is already in an operable condition at the starting time, and accordingly, the inference can be carried out immediately if necessary. When the operator inputs a rule or a fact for editing the knowledge data base, the rule or the fact is stored in a part of the user's memory 4 in step n1. At step n2 the system detects whether the stored information is consistent with the rules and facts stored in the system's memory 5. If the stored information is found to be consistent with the rules and facts in the system's memory 5 at step n3, the knowledge editor is immediately put into operation at step n4, so that the rule or the fact stored in the user's memory 4 is transferred to the system's memory 5 for storing at step n5. Then, the knowledge editor is stopped at step n6.

In the meantime, if the stored information in the user's memory 4 is found not consistant with the data in the system's memory 5 at step n3, the stored information is erased. Thereafter, the system goes back to step n1. In other words, according to the above-described example, even in the case where the editing of the data has to be conducted again from the beginning because the temporarily-stored information in the user's memory is not consistent with the data in the system's memory, it is not necessary to operate the knowledge editor and the inference part from the start to end again. Only the temporarily-stored information is erased, and a fresh rule or fact to be added or erased is inputted.

Figure 3:
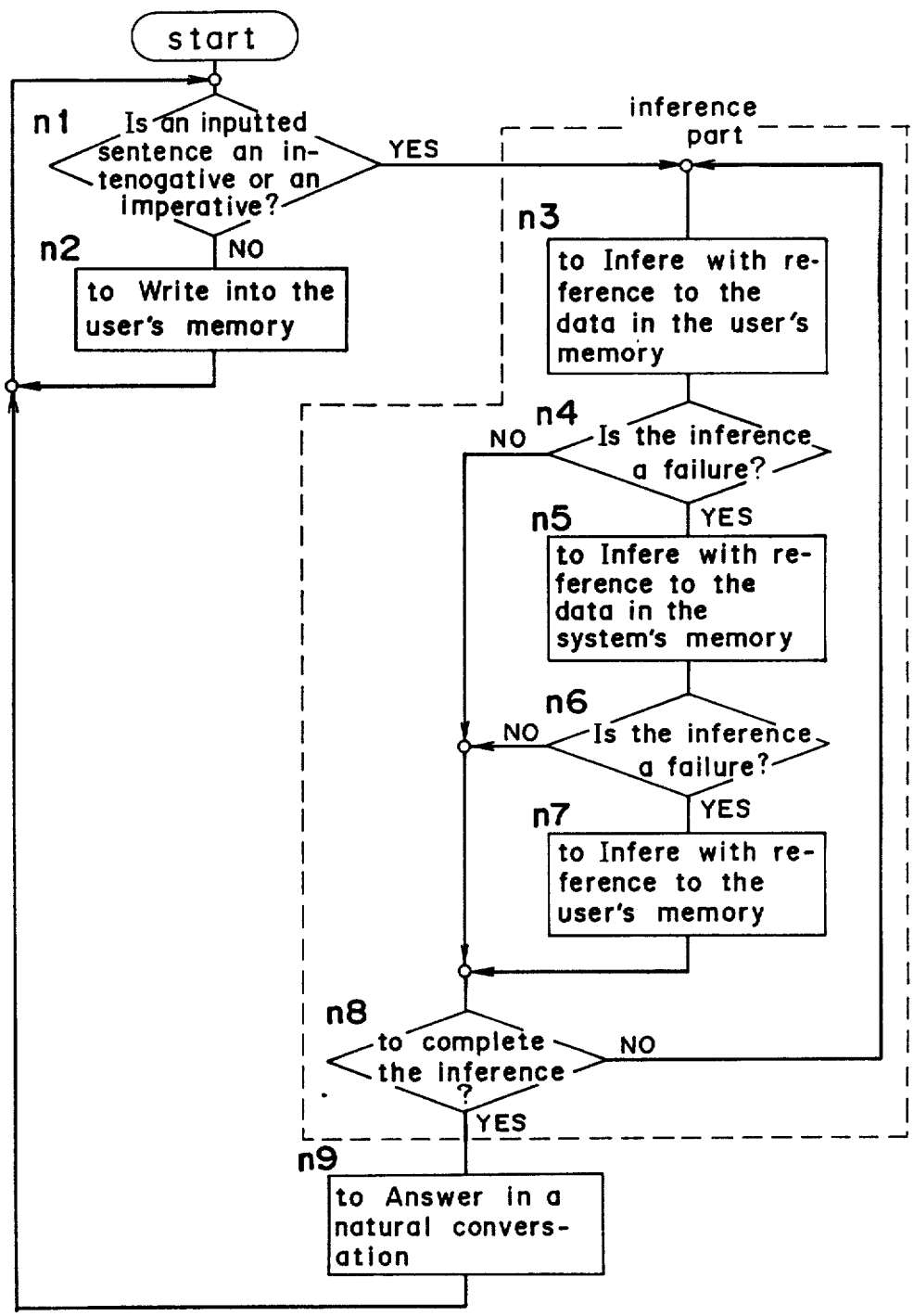
FIG. 3 is a flow-chart giving a detail of the flow in the portion of FIG. 2.
Figure 4:
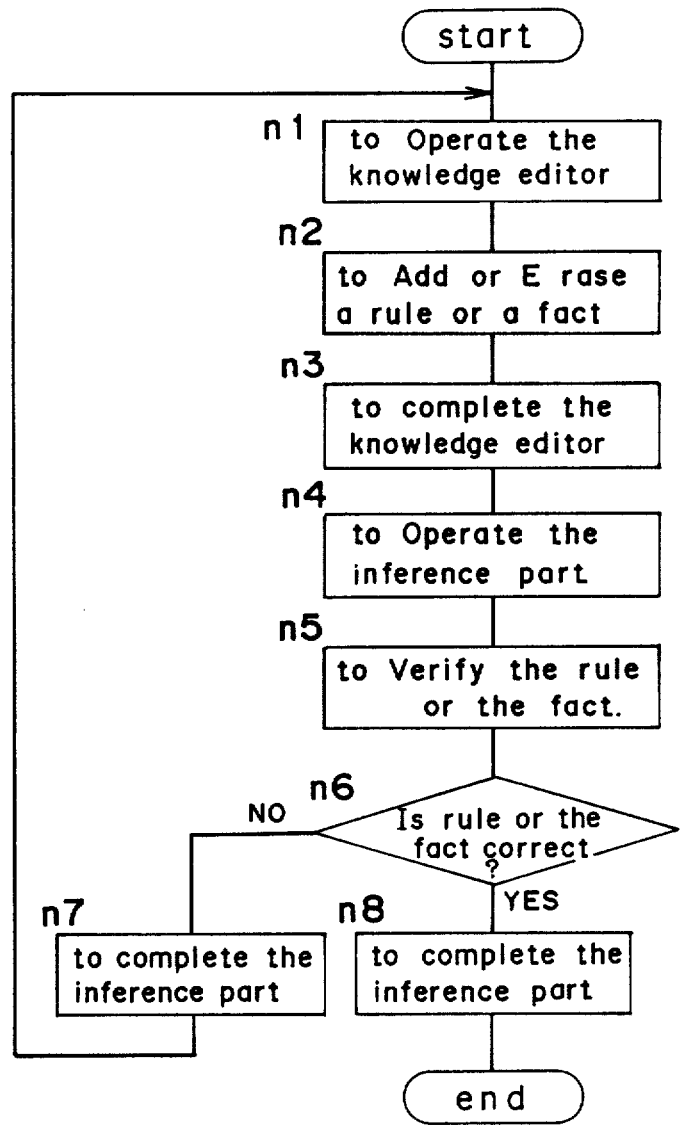
FIG. 4 is a flow-chart showing the procedure of edition of the knowledge data base according to a prior art inquiry-and-answer system of this kind.

With further reference to the flow-chart of FIG. 3, the editing procedure will be described more in detail. In the instant example, the inputted sentence determines whether the information should be stored in the user's memory 4 or the inference part should start to work. In other words, when the inputted sentence is an interrogative sentence or an imperative sentence, the inference part is operated. In the other cases, the inputted sentence is stored in the user's memory 4.

Now, supposing that the rule and the fact to be added or erased are inputted in order to edit the knowledge data base, the data are temporarily stored in the user's memory 4 (steps n1 and n2). Further, when an interrogative sentence or an imperative sentence corresponding to the temporarily-stored data is inputted, the system goes to step n3 where the inference (for verification) is carried out with reference to the data in the user's memory 4. If the inference results in a failure (step n4), another inference is conducted at step n5 with reference to the data in the system's memory 5. It is detected at step n6 whether the inference is a success or a failure. If the result of the inference shows a failure, a further inference with reference to the user's memory 4 is carried out at step n7.

The reason for the inference again with reference to the user's memory 4 at step n7 is as follows. With any unsettled or uncertain condition observed during the inference in steps n3 and n5, the system makes an inquiry to the operator, waiting for a response to be inputted by the operator. At this time, step n1 is called for. On this occasion, however, if a fact or a rule which is not a response to the inquiry is inputted by the operator, the fact or the rule is stored in the user's memory 4, which becomes consequently necessary to be verified with reference to the user's memory 4.

Thus, in the manner as described above, the facts and the rules written into the user's memory 4 are inferred, with consideration of the data in the user's memory 4 and in the system's memory 5, so as to be verified whether the written facts and the rules match the contents in the user's memory 4 and system's memory 5. Thereafter, the system executes steps n8 and n9 and returns to step n1.

According to this first embodiment of the present invention, an inputted sentence, if it is a fact or a rule, is temporarily stored in the user's memory 4 to which the operator can write the data freely. On the other hand, if interrogative sentence or an imperative sentence is inputted, the inference part is automatically brought into operation to carry out inferences about the inputted sentence with reference to the data in the user's memory 4 and the system's memory 5. Accordingly, the rule or the fact temporarily stored in the user's memory 4 are verified.

If the verification indicates that the temporarily-stored rule or fact is consistent with the data in the user's memory and the system's memory, the rule or the fact is finally stored into the system's memory 5. Therefore, it is not necessary, according to the present invention, for the knowledge editor to operate completely in the editing of the data. Further, since the inference part's operation can be automaticlly started, the rules and facts can be considerably easily edited in the system's memory 5.

As is described above, in the editing system of the knowledge data base in the inquiry-and-answer system of the present invention, the information as to the editing of the rules and facts, for example, the addition or the erasure of rules and facts, is temporarily stored in the memory which the operator of the system can freely write data into, so that the temporarily-stored information is verified before transferring to the memory or the knowledge data base. Accordingly, the knowledge data base can be edited with much ease according to the present invention.

Next, the second embodiment of the present invention will be described. In an inputting system of the inquiry-and-answer system according to the second embodiment of the present invention the inputting system is arranged so that the necessary facts for the inference can be extracted without strict analysis of the meaning of a response to an inquiry, by taking into consideration both the response from the operator and the inquiry from the system.

Referring to FIG. 5, a functional block diagram of the inputting system in the inquiry-and-answer system of the present invention is shown. The left side of the dotted-line is the side of an operator (an inquirer), and the right side of the dotted-line is the side of an inquiry-and-answer system 18. The inquiry-and-answer system 18 is roughly divided into an inference part 16, a long-term memory 12 and a short-term memory 13. An editor 11 is used for inputting information from the operator to the long-term memory 12. Moreover, an input interface (I/F) 14 and an output interface (I/F) 15 are provided in the inquiry-and-answer system 18 to be used for inputting the information from the operator to the inference part 16 and for outputting the information from the inference part 16 to the operator, respectively.

Various kinds of rules and a fixed data base to be employed in the inquiry-and-answer system are already stored in the long-term memory 12 from the outside (from the side of the operator) and the long-term memory 12 cannot be written into from the inference part 16. On the other hand, the short-term memory 13 is a memory which facts or the like obtained through the conversation between the system and the operator are read out from or written into, and therefore, the facts or the like in the short-term memory 13 can be read by the inference part 16 or written into by the inference part 16. In the input I/F 14, a sentence (response) is inputted by the operator in the form of a voice sound or KB and changed into a form of internal structure that is utilizable by the inference part 16. More specifically, the inputted sentence is analyzed with respect to the elements, the syntax, and the meaning of the sentence, respectively, by the input I/F 14. Outputs from the inference part 16 are changed by the output I/F 15 into the form of a sentence, a voice sound, a figure, or a picture image that is comprehensible by the operator.

FIG. 6 shows an example of the internal structure employed in the inquiry-and-answer system 18. The internal structure shown in FIG. 6 is arranged so that a unit of delinable words 21 is indicated in correspondence to the information 22 which includes a case nominal 22b, its deep case 22a, a suffix 22c, the number of the sentence 22e, and a distinction 22d whether the sentence is an affirmative or a negative.

Figure 7:
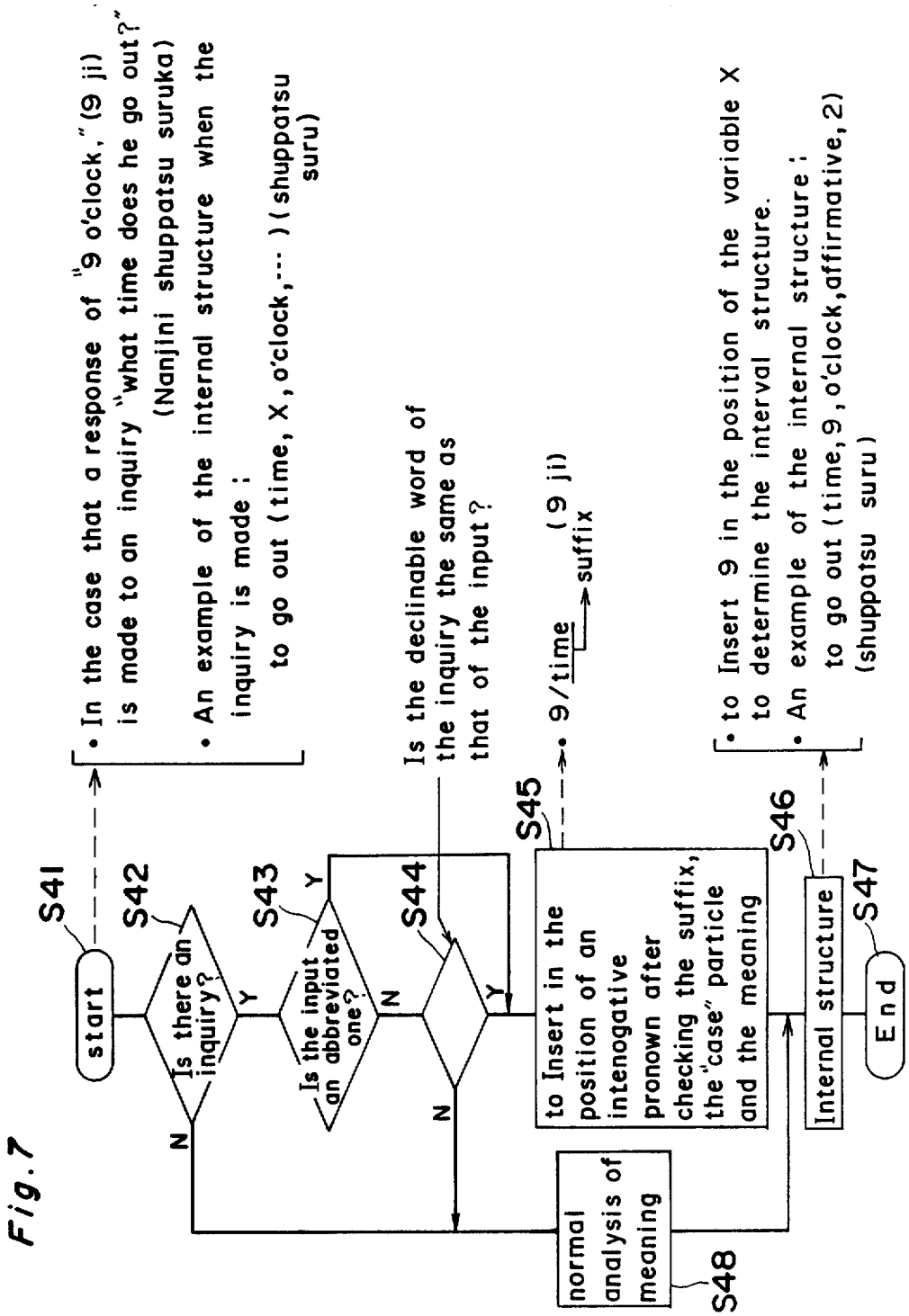
FIG. 7 is a flow-chart showing the procedure of inputting to the inquiry-and-answer system of FIG. 5.

The operating procedure of the inputting system of the present invention will be described in detail with reference to the flow-chart of FIG. 7. In step S42, the response by the operator is checked whether or not it corresponds to the inquiry by the system. If the inputted sentence does not correspond to the inquiry by the system, the internal structure of the sentence is determined at step S46 after a normal analysis of the meaning has been carried out in step S48. On the contrary, if the inputted sentence corresponds to the inquiry by the system, it is checked at step S43 whether or not the inputted sentence is an abbreviated one. In the case where the inputted sentence is an abbreviated sentence, the analysis of the meaning is conducted, in accordance with the present invention, from the viewpoint of a suffix, a "case" particle, and a semantic maker. The thus-obtained case nominal is then inserted into the position of an interrogative pronoun of the inquiry from the system at step S45, thereby determining the internal structure of the inputted sentence at step S46. Further, in the case of the non-abbreviated sentence, the analysis of meaning is performed in accordance with the present invention at step S45 where the declinable word used in the inquiry is the same as in the inputted sentence. If the declinable word in the inquiry is not the same as in the inputted sentence, the analysis of meaning is conducted in accordance with the prior art system in step S48. Then, the internal structure is decided at step S46. Now, it will be explained with respect to the case where the operator makes an abbreviated response, namely, "9 o'clock." (an English version for a Japanese sentence of "9 ji") to an inquiry from the system, i.e., "What time does he start?" (an English version for a Japanese sentence of "Nanji ni shuppatsu shimasuka"). In this case, the system asks the above-described inquiry since the case nominal for time is not clear with respect to the declinable word "start". The answer to this inquiry "9 o'clock." includes the suffix "o'clock". Therefore, the system judges "9" before "o'clock" as the case nominal which is not clearly defined in the inquiry, and inserts the "9" in the position of the case nominal, thereby determining the internal structure of the declinable word "start".

It is to be noted here that although there are proposed various kinds of methods for the analysis of the meaning, it is done in the present invention through checking of a "case" particle, a suffix and a semantic maker. Since the "case" particle and the suffix appear next to the case nominal, they are useful to extract the case nominal. The meaning marker is a sign representing the kind of the surface "case", which is attached to each surface "case" of the dictionary empolyed in analyzing the construction of the sentence at step S33. Accordingly, on the basis of respective information with respect to the meaning marker of each surface "case", the suffix and the "case" particle of the inputted sentence, the deep case of the inputted sentence is decided.

As is made clear in the second embodiment, an input (response) by the operator is comprehended, when the inquiry by the inquiry-and-answer system is taken into consideration, and accordingly, even when the input by the operator is an abbreviation, the internal structure of the input can be easily determined. Thus, according to the inputting system of the present invention, the operator can simply and concisely respond to the inquiry from the system. Moreover, even if the same inquiry is repeatedly generated by the system, the answer to the inquiry can be omitted, resulting in reduction of complicated operations in inputting the data. The inputting system of the present invention is remarkably efficient in practical use.

What is claimed is:

1. A method for introducing information into an inquiry-and-answer system comprising the steps of:
   (a) presenting an interrogative to an operator to seek a response;
   (b) inputting a desired sentence to be analyzed as a response to the presented interrogative;
   (c) analyzing the desired sentence to determine different components of the desired sentence;
   (d) extracting necessary components from the desired sentence;
   (e) developing inferences from the necessary components;
   (f) using said inferences of step (e) to obtain a case nominal corresponding to a pronoun used in the interrogative; and
   (g) supplying said case nominal as an answer to said interrogative of step (a).

2. The method as claimed in claim 1, wherein said step (d) further comprises the steps of:
   (h) using said inferences of step (e) to determine if the desired sentence contains a case particle;
   (i) extracting the case particle from the desired sentence when the desired sentence contains the case particle;
   (j) supplying said case particle and a case nominal related to said case particle as necessary components to an answer to said interrogative step (a);
   (k) using said inferences of step (e) to determine if the desired sentence contains a suffix;
   (l) extracting the suffix from the desired sentence when the desired sentence contains the suffix;
   (m) supplying said suffix and a case nominal related to said case particle as necessary components to an answer to said interrogative of step (a);
   (n) using said inferences of step (e) to determine the semantics of the desired sentence; and
   (o) supplying the semantics and a case nominal related to said case particle as necessary components to an answer to said interrogative of step (a).

* * * * *